(12) United States Patent
Englund et al.

(10) Patent No.: US 7,756,543 B2
(45) Date of Patent: Jul. 13, 2010

(54) HIGH SPEED SHARED RADIO CHANNEL TRANSMIT POWER CONTROL

(75) Inventors: Eva Englund, Linköping (SE); Niclas Wiberg, Linkoping (SE); Jonas Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1307 days.

(21) Appl. No.: 11/222,236

(22) Filed: Sep. 9, 2005

(65) Prior Publication Data

US 2007/0060187 A1 Mar. 15, 2007

(51) Int. Cl.
H04B 7/00 (2006.01)
H04B 1/00 (2006.01)
H04B 7/10 (2006.01)
H04B 7/185 (2006.01)
H04B 7/216 (2006.01)
H04M 3/00 (2006.01)
H04W 72/00 (2009.01)
H04W 4/00 (2009.01)
H04L 1/02 (2006.01)

(52) U.S. Cl. ............... 455/522; 455/69; 455/418; 455/420; 455/452.1; 375/148; 375/150; 375/347; 370/318; 370/328; 370/335; 370/342

(58) Field of Classification Search ............... 455/13.4, 455/67.11–67.14, 69, 561, 516, 517, 522, 455/70, 84, 125, 126, 127.1, 127.2, 134, 455/136, 137, 138, 404.1, 404.2, 405, 418, 455/419, 420, 442, 447, 452.1, 452.2, 455, 455/456.1, 456.2, 515, 115.1, 245.1, 226.1–226.3, 455/232.1–245.2, 422, 423, 424, 450, 501, 455/504, 436, 437, 439; 370/318, 319, 332, 370/203, 204, 208, 229, 230, 280, 320, 328, 370/331, 334, 335, 336, 337, 342, 348, 329, 370/441, 468, 350; 375/225; 342/174, 357.06, 342/387, 442, 457, 465

See application file for complete search history.

(56) References Cited

U.S. PATENT DOCUMENTS 6,535,723 B1 * 3/2003 Jiang et al. ............... 455/245.1

(Continued)

FOREIGN PATENT DOCUMENTS

EP 1 463 230 4/2004

(Continued)

OTHER PUBLICATIONS

International Search Report and Written Opinion for International Application PCT/SE2006/050293 dated Mar. 6, 2007.

(Continued)

Primary Examiner—Nay A. Maung
Assistant Examiner—Paul P Tran
(74) Attorney, Agent, or Firm—Nixon & Vanderhye P.C.

(57) ABSTRACT

To increase throughput efficiency and attain a higher achieved bit rate for data transmissions over a high speed shared channel, a variable transmit power increase factor is used to control the maximum rate at which the power at which data is transmitted over the high speed shared channel can increase. In one non-limiting implementation, the power increase factor F is varied with the current total downlink transmitted power available for high speed downlink transmission. For example, when the available high speed shared channel power is large, the variable transmit power increase factor assumes a more conservative value, e.g., a smaller F value, at the beginning of the high speed downlink transmission, and then a more liberal value, e.g., a larger F value, later during the high speed downlink transmission.

17 Claims, 4 Drawing Sheets

U.S. PATENT DOCUMENTS

| | | |
|---|---|---|
| 6,912,228 B1 | 6/2005 | Dahlman et al. |
| 7,054,633 B2 * | 5/2006 | Seo et al. ............... 455/439 |
| 2003/0039217 A1 * | 2/2003 | Seo et al. ............... 370/318 |
| 2003/0095515 A1 * | 5/2003 | Uebayashi et al. ....... 370/329 |
| 2003/0156554 A1 | 8/2003 | Dillinger et al. ......... 370/318 |
| 2004/0001472 A1 * | 1/2004 | Kwak et al. ............. 370/342 |
| 2004/0114555 A1 * | 6/2004 | Hayashi et al. .......... 370/329 |
| 2005/0018656 A1 | 1/2005 | Rudolf et al. |
| 2005/0070319 A1 | 3/2005 | Pedersen |
| 2005/0100038 A1 | 5/2005 | Pietraski et al. |
| 2005/0113104 A1 | 5/2005 | Chen et al. ............. 455/452.2 |
| 2006/0135193 A1 * | 6/2006 | Ratasuk et al. .......... 455/522 |
| 2007/0086381 A1 * | 4/2007 | Lee et al. ............... 370/331 |

FOREIGN PATENT DOCUMENTS

| | | |
|---|---|---|
| WO | 02/085059 | 10/2002 |
| WO | WO 2006/065183 | * 12/2004 |

OTHER PUBLICATIONS

T.J. Moulsley; "Performance of UMTS High Speed Downlink Packet Access for Data Streaming Applications;" Third International Conference on 3G Mobile Communication Technologies, 2002, (Conf. Publ. No. 489); May 8-10, 2002; pp. 302-307.

TSG RAN WG1, Change Request, 25.215 CR 134 V 5.2.0; "Non-HSDPA Power Measurement;" 3GPP TSG-RAN Meeting #31; Feb. 2003; R1-030206; pp. 1-3.

Sophia Antipolis; RAN WG3, Change Request, 25.433 CR 801: "HS-DSCH: Addition of non HS-DSCH Power Measurement;" 3GPP TSG-RAN3 Meeting #34; Feb. 17-21, 2003; R3-030283; pp. 1-18.

International Search Report mailed Jul. 23, 2003 in corresponding PCT Application PCT/SE03/00694.

Parkvall et al.; "Evolving WCDMA for Improved High Speed Mobile Internet;" Future Telecommunications Conference, Nov. 2001.

$3^{rd}$ Generation Partnership Project; Technical Specification Group Radio Access Network; High Speed Downlink Packet Access (HSDPA); 3GPP TS 25.308 V5.2.0 (Mar. 2002).

IPRP mailed Sep. 16, 2004.

Related U.S. Appl. No. 10/371,199, filed Feb. 24, 2003; Inventors: Wiberg et al.

* cited by examiner

HIGH SPEED SHARED RADIO CHANNEL TRANSMIT POWER CONTROL

CROSS-REFERENCE TO RELATED APPLICATIONS

This application is related to commonly-assigned U.S. patent application Ser. No. 10/371,199, entitled "Radio Resource Management for a High Speed Shared Channel," the entire content of which is incorporated here by reference.

TECHNICAL FIELD

The technical field is wireless multi-cell communications. The present invention relates to controlling the transmission power used by a base station when providing high speed downlink packet access (HSDPA) services to wireless radio units.

BACKGROUND AND SUMMARY

The third generation partnership project (3GPP) wideband code division multiple access (W-CDMA) system is outlined in the operational scenarios for universal mobile telecommunications system (UMTS) releases R99/R4 and R5. Release 5 of the UMTS frequency division duplex (FDD) and time division duplex (TDD) modes have incorporated a feature called high speed downlink packet access (HSDPA) for improving throughput, latency, and spectral efficiency in the downlink from the radio network to a wireless radio unit referred to as a user equipment (UE) or mobile stations. The principle of HSDPA is to schedule packet transmissions on the air interface to different UEs as a function of their instantaneous experienced radio and service conditions in a dynamic manner, (e.g., every 2 ms in FDD or every 10 ms in wideband TDD).

The key HSDPA functions in both FDD and TDD modes include: (i) fast retransmissions (Hybrid ARQ) of downlink packets received in error over the air interface, (ii) fast uplink notification of downlink packets received in error (Acknowledgements/Negative Acknowledgements), (iii) fast channel feedback in the uplink on the downlink channel state of a UE, and (iv) fat-pipe scheduling for efficiently servicing many users in the downlink. The dynamic HSDPA packet scheduler is located in the base station (referred to as the Node B in 3GPP) and operates substantially independently from the radio network controller (RNC).

The RNC in a UMTS network has responsibility for network control and radio resource management (RRM). The RNC performs tasks such as user admission control and interference management using dynamic channel allocation (DCA) algorithms to provide reliable system operation and good system efficiency. One measure of high efficiency is when a high level of overall throughput is achieved.

In an FDD system, the RNC allocates a certain number of spreading codes for the usage of HSDPA data channels (high speed-downlink shared channels (HS-DSCHs)) to each cell. Furthermore, in the FDD system, the HS-DSCH is transmitted over an HS transmission timing interval (TTI) length of 3 consecutive timeslots (3*0.66 ms=2 ms). The RNC communicates with the base station indicating what spreading codes can be used for HSDPA and subsequently passing control on when to send downlink packets using these codes to the base station. The RNC also notifies the UE by control signaling regarding which physical channels to listen for the HSDPA control channels, i.e., high speed shared control channels (HS-SCCHs), which in turn are used by the base station to dynamically notify UEs of the arrival of scheduled downlink packets on its HS-DSCH. Also, the same information is sent from the RNC to base station, such that the base station is informed regarding which HS-SCCH a UE is to be alerted when HSDPA data is to be sent to the UE. As mentioned already, the base station acts on an independent basis to determine, based on its HSDPA scheduler, when to transmit HSDPA data to a particular UE.

In a TDD system, the RNC allocates a certain number of timeslots (TSs) for the usage of HSDPA data channels (HS-DSCHs) to each cell. The RNC communicates to the base station that the TSs and spreading codes that can be used for HSDPA and subsequently passes control on when to send downlink packets using these TSs and codes to the base station. Similar procedures are then followed as described above for the FDD system.

In any CDMA system, efficient power management is important to keep interference low and to maximize the system capacity, i.e., the number of simultaneously supported users and overall data throughput for all cells in an area. For interference management, both FDD and TDD employ fast closed-loop power-control (PC) in the downlink for the dedicated channels. Furthermore, for the most common case of FDD and TDD conventional Release 99, 4, and 5 (R99, R4, and R5) dedicated channels (DCHs), that closed loop power control operates within RNC controlled power limits. Thus, a dynamic power range is pre-established at dedicated channel (DCH) setup and eventually adjusted during the life-time of the DCH by the RNC. The RNC signals the base station the PC dynamic range in the form of a maximum transmit (Tx) power not to be exceeded and a minimum Tx power to be maintained because the RNC must make complex decisions to enhance the system performance. For example, a UE requiring too much power, and thus frequently requiring the upper limit of the allowed dynamic range, creates excessive interference to other users in the system. The RNC may want to drop or to handover this UE's connection. For common channels of both TDD and FDD systems, control over the possible power settings is also important to ensure that adequate coverage and service are available.

The RNC allocates a maximum amount of downlink (DL) power as a fraction of the total available base station Tx DL power to maintain the relatively high-level of interference created by the HSDPA channels within reasonable limits. This is implemented by signaling over the RNC/base station interfaces (Iub) when configuring downlink channels in the base station. Otherwise, an HSDPA UE at a cell border could eventually be served by the base station at a high HSDPA data rate and create such a high level of interference that services in the neighboring cells would be heavily impacted and result in an unacceptable degradation of overall system capacity or service to non-HSDPA UEs. Another reason for the existence of such a control mechanism is that a certain amount of base station downlink Tx power needs to be reserved for non-HSDPA channels, such as pilot channels, common control channels, and non-HSDPA DCHs. The RNC set maximum HSDPA power fraction per cell in turn indirectly determines the maximum data rate with which any given UE can be serviced.

Related to power control is the variable quality of the radio channel or link from base station to UE. The detected radio channel or link quality depends on a number of factors including the transmit power level, the distance between the mobile terminal and a transmitting base station in the radio network, interference from other transmitting base stations and mobile terminals, path loss, shadowing, short term multi-path fading, etc. If the channel quality is good, the base station may modify the signal transmission parameters to increase the data transmission rate from the base station to the UE. On the other hand, if the channel quality is bad, the signal transmission parameters may need to be adjusted to lower the data transmission rate to ensure that the signal is reliably received.

The process of modifying one or more signal transmission parameters to compensate for channel quality variations is referred to as "link adaptation," where "link" refers to the radio link between a base station and a mobile terminal. Link adaptation may be accomplished by changing the transmit power of the base station or effective bit rate over the link, e.g., increasing the transmit power level or decreasing the bit rate for data transmitted to mobile terminals with a bad channel quality. Link adaptation may also be accomplished by changing the type of modulation and the amount of channel coding applied to the data to be transmitted by the base station.

The UEs estimate channel quality by measuring the signal quality of pilot signals or other broadcast signals transmitted by nearby "candidates." Based on the estimated channel qualities, each UE sends a channel quality index (CQI) report to the radio network that recommends a maximum data rate at which the UE can receive data from each candidate base station. The performance of a link adaptation scheme depends on the accuracy of the signal quality measurement made by the UE. It is especially important that the signal quality measurements do not over-estimate the future signal quality. In the case of over-estimation, the link adaptation will select transmission parameters that are not sufficiently robust for the actual channel condition. Ideally, the UE should accurately estimate a future radio channel condition at the time when the data packet transmission from the base station and use those current signal quality measurements as estimates of the radio channel condition when the future packet transmission occurs. Unfortunately, there are circumstances when such estimates are not accurate.

One such circumstance arises in systems where the HSDPA channels may use the remaining power of the total available power that is not used by other non-high speed (non-HS) channels. Therefore, when there are few non-HS users in the system, there can be a very large difference between the total power level in the cell before and after a HS-DSCH user starts receiving data in the cell. In that case, users in the cell will experience a large difference in the interference before and after a HS-DSCH user starts receiving data. Normally, a large increase in interference has the effect of reducing the obtained bit rate, since a more robust transport format is selected. The transport format selection is chosen to achieve a certain BLER (Block-Error Rate) based on the CQI reported by the UE and the available power. Hence, to accurately select the proper transport format, there should be a good match between reported CQI and channel quality when the actual transmission occurs. But in the scenario above, there may be a large mismatch between the reported CQI and the actual channel quality. Specifically, there may be a large mismatch in the initial choice of transport format because of a large difference in the total transmit power before and after a HS-DSCH user enters the system. In case of applications that generate data packets in many small bursts, such as TCP-based applications, this mismatch may occur frequently. For example, during the TCP "slow start" phase, which operates by controlling the rate at which new packets should be transmitted downlink based on the rate at which packet acknowledgments for previously transmitted packets are returned by the UE. This leads to a frequent series of retransmissions that result in a significant throughput reduction due to the "exponential backoff" of TCP, in which the retransmission timer is doubled for each retransmission. If an acknowledgement of a TCP segment is not received before the retransmission timer expires the TCP segment is retransmitted.

FIG. 1 shows a Cumulative Distribution Function (CDF) of the bit rates for 10 Mbyte web object downloads to a UE in a good receiving position. The CDF describes the probability that a variable takes on a particular value. The graph assumes only a single cell and no other UEs present in the cell. As shown, in approximately 50% of the downloads, the bit rate is below 1 Mbit/s, which is much lower than the maximum achievable bit rate of approximately 5.25 Mbit/s.

One way of dealing with this problem is to only permit a gradual increase in the power at which data is transmitted to the new HS-DSCH user. For example, the rate at which the total transmit power $P_{tx}$ level in the cell can increase is limited a constant power increase factor. Gradual changes to the base station transmit power do not significantly affect the accuracy of the mobile terminal channel quality estimates and a decreased probability of low throughput is achieved because of fewer corrupted data packets and retransmissions. But a drawback with a constant gradual power adjustment approach is that for a small constant power increase factor, the maximum reachable throughput is reduced. This problem is illustrated in FIG. 2.

The graphs in FIG. 2 show CDFs using different constant gradual power adjustment factors F. The CDFs show that decreased probability of low bit rate is obtained at the cost of lower achievable bit rate. For example, for F=1.03, the CDF shows that at a probability of 0.1, i.e., in 10% of the downloads, a web object bit rate less than or equal to 4.6 Mbit/s is attained. In 90% of the downloads, a bit rate higher than 4.6 Mbit/s was attained. Although much improved, 4.6 Mbit/s is still lower than the maximum achievable bit rate of approximately 5.25 Mbit/s.

The present inventors recognized that a solution to this problem is to use a variable transmit power increase factor rather than a constant transmit power increase factor. In one non-limiting implementation, the power increase factor F is varied with the current total downlink transmitted power available for high speed downlink transmission. For example, when the available high speed shared channel power is large, the variable transmit power increase factor assumes a more conservative value, e.g., a smaller F value, at the beginning of the high speed downlink transmission, and then a more liberal value, e.g., a larger F value, later during the high speed downlink transmission.

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using a non-limiting example to downlink high speed shared channels in a 3G environment, the present invention may be employed for uplink data transmissions as well and in any type of radio communications system that would benefit from the described technology.

In some instances, detailed descriptions of well-known methods, interfaces, circuits, and signaling are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
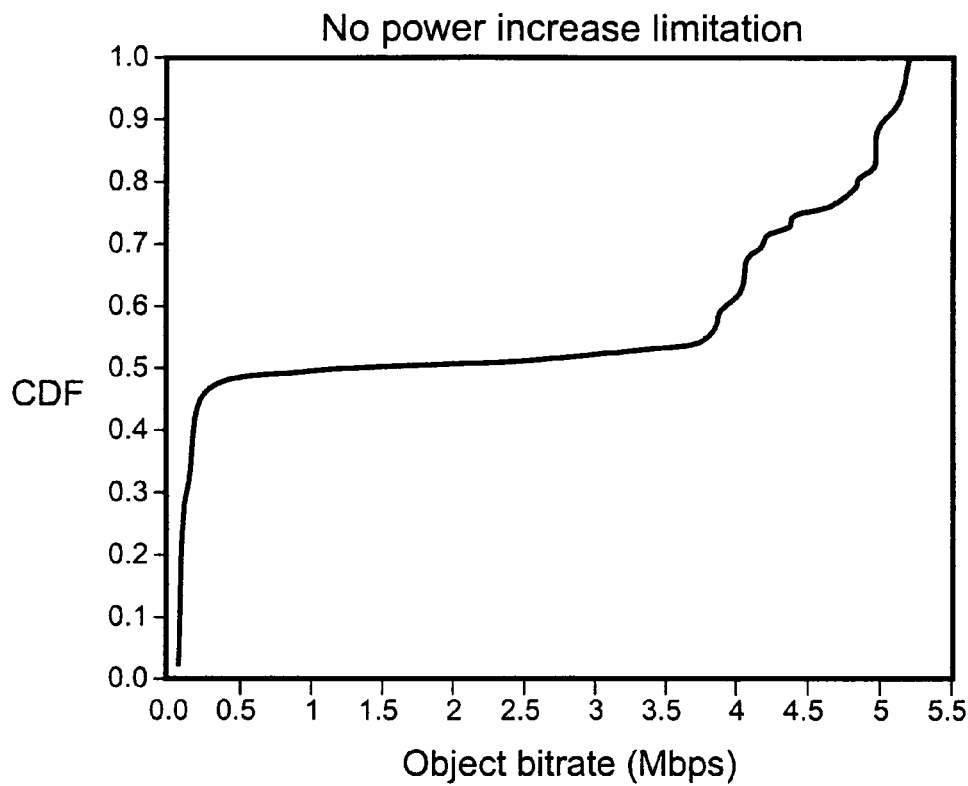
FIG. 1 is a graph illustrating a cumulative distribution function (CDF) versus downloaded object bit rate without any transmit power increase limitation.
Figure 2:
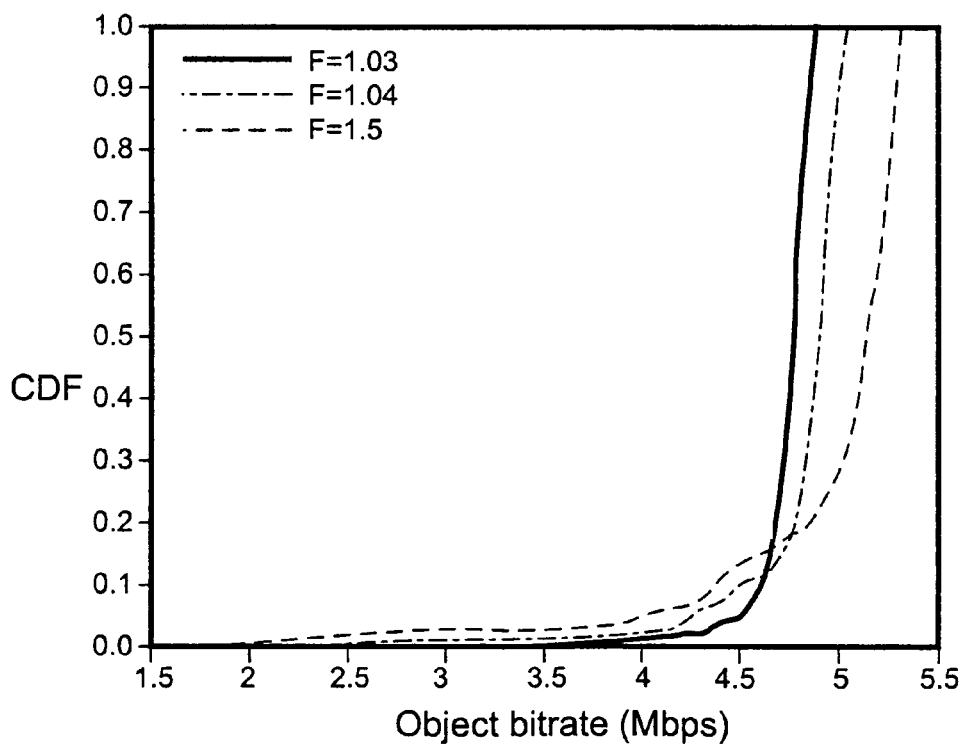
FIG. 2 is a graph illustrating a cumulative distribution function (CDF) versus downloaded object bit rate using a constant transmit power increase limitation.
Figure 3:
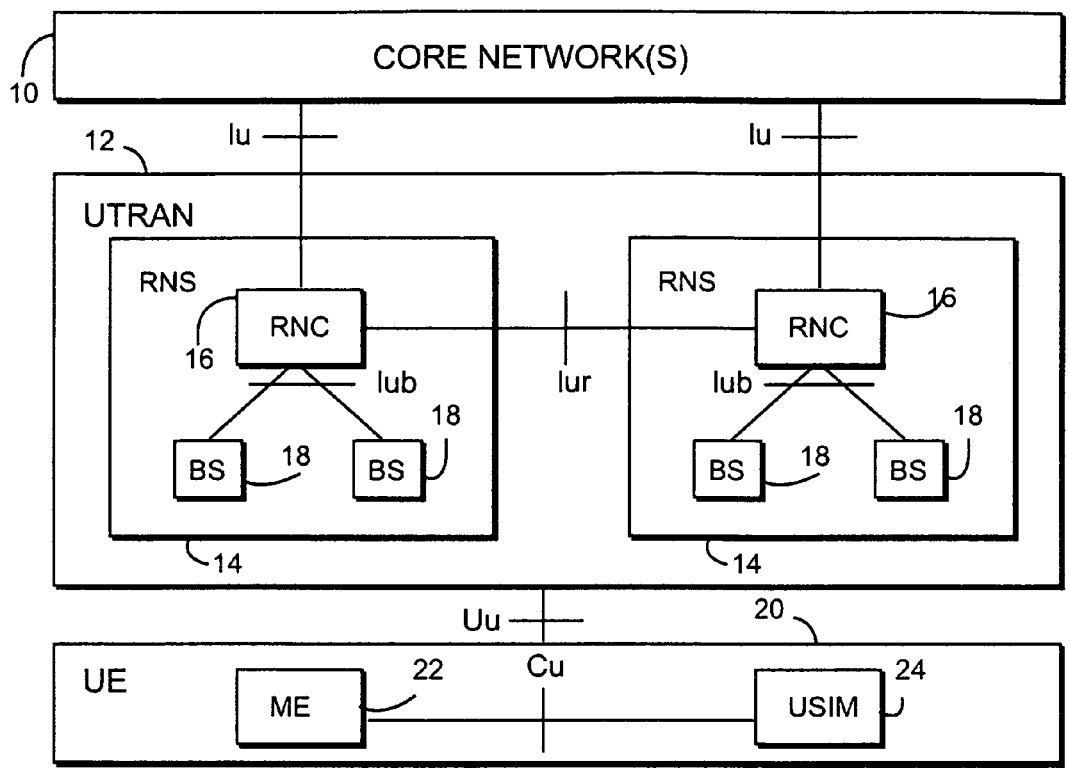
FIG. 3 is simplified function block diagram illustrating an example radio communications system.

FIG. 3 shows a non-limiting example of a third generation radio system known as UMTS (Universal Mobile Telecommunications System) and IMT-2000 (International Mobile Telecommunications 2000). Although the invention finds useful application in this example, the invention may also be used in other radio systems. The radio system includes one or more core networks 10, a radio access network 12 and user equipment (UE) 20. The term UTRAN means UMTS Terrestrial Radio Access Network and is the radio access network specified by 3GPP and is implemented using wideband code division multiple access (WCDMA) technology. The UTRAN includes one or more radio network controllers (RNCs) 16 coupled to one or more base stations sometimes referred to as Node-Bs 18. The UTRAN 12 communicates with the core network 10 via an Iu interface. The RNC 16 manages each base station 18 through an Iub interface. The RNCs 16 communicate via an Iur interface.

The UTRAN 12 communicates with multiple user equipments (UEs) 20 over a Uu wireless interface. A UE may comprise mobile equipment (ME) 22 and a UMTS subscriber identity module (USIM) 24. The USIM 24 contains information related to the user and information related to security, for instance, an encryption algorithm. A UE includes but is not limited to a subscriber terminal, a mobile terminal, a mobile phone, a cell phone, a mobile station, a wireless terminal, etc.

Each cell area serviced by a base station or base station sector in the radio network 12 employs various types of radio channels to communicate with UEs 20 including dedicated channels, common channels, pilot or broadcast channels, and one or more high speed channels. In this example, downlink high speed channels include a high speed-downlink shared channel (HS-DSCH) and a high speed-downlink shared control channel (HS-SCCH).

Figure 4:
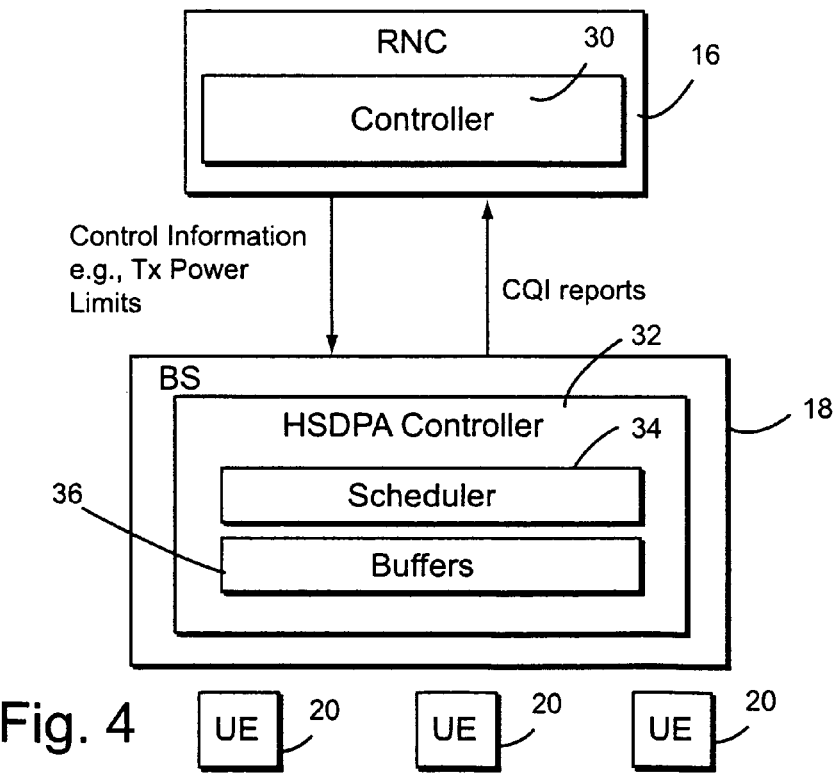
FIG. 4 is simplified function block diagram illustrating further details of the RNC and BS shown in the example radio communications system of FIG. 3.

FIG. 4 illustrates the control signaling between a power controller 30 in the RNC 16 and an HSDPA controller 32 in the base station 18. The HSDPA controller 32 includes a scheduler 34 for scheduling transmissions over the high speed downlink channel(s) to a UE 20 and one or more buffers for storing data for transmission to the UE 20 over the high speed downlink channel. The RNC controller 30 sends transmit power limits including a maximum allowed HSDPA transmit (Tx) power and possibly a minimum allowed HSDPA transmit (Tx) power to the HSDPA controller 32 in each base station 18. The base station 18 receives from UE (Channel Quality Indicator) CQI reports and ARQ or hybrid ARQ feedback information.

The HSDPA controller 32 supports fast link adaptation (LA) where the bit rate over the high speed transport channel is varied in each transmission time interval (TTI). The bit rate is varied by mapping the high speed transport channel into a variable number of parallel spreading codes with a variable effective code rate (ECR). Mapping is performed by using a QPSK (quadrature phase shift keying) or 16 QAM (16-quadrature amplitude) modulation. With help of the CQI report, the HSDPA controller 32 selects a transport block size (TBS) to be used during the next transmission time interval as well as the transport format (TF) including modulation scheme and the number of parallel spreading codes.

Figure 5:
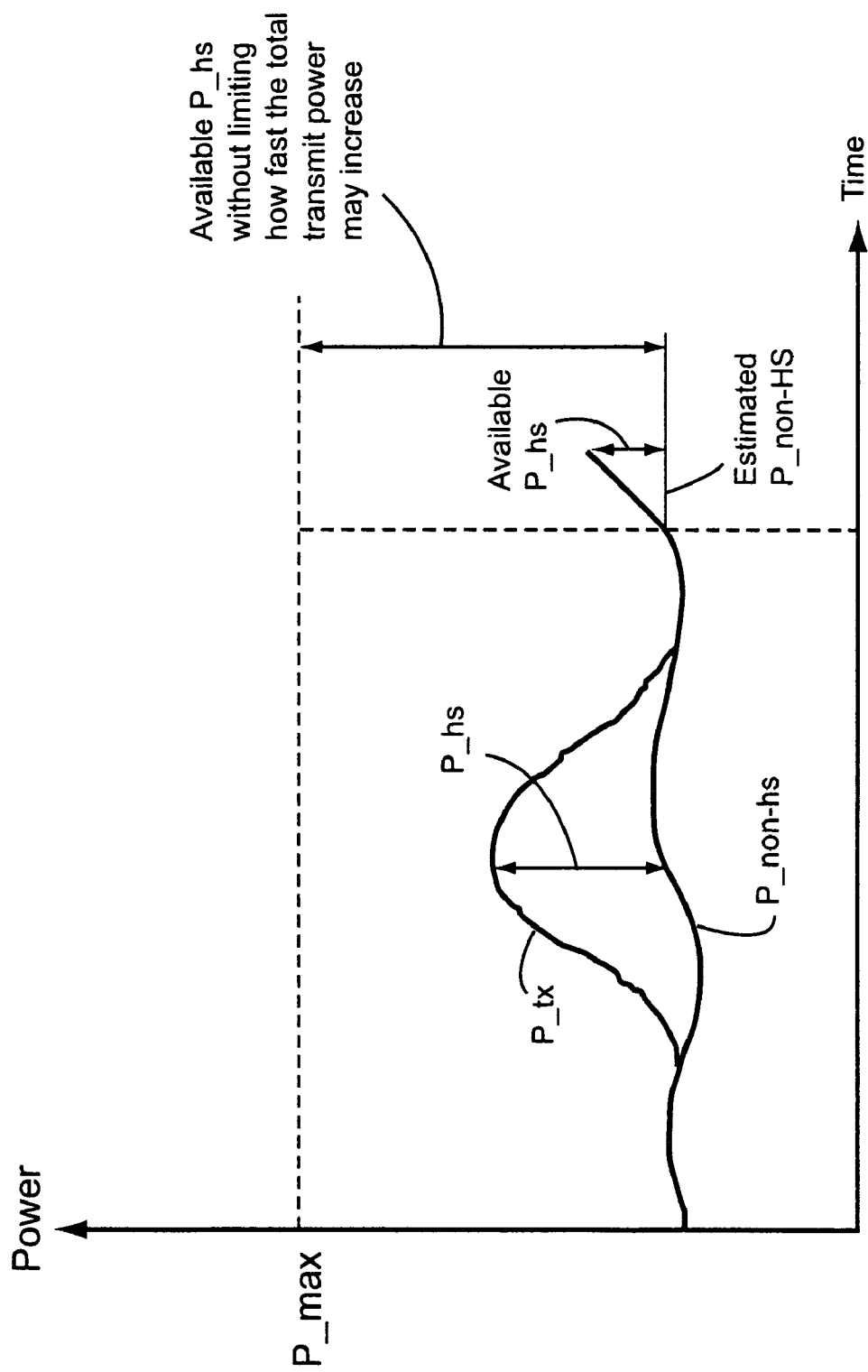
FIG. 5 is a graph illustrating various power values versus time.

In performing link adaptation for the high speed transport channel, the HSDPA controller 32 must ensure that the maximum transmit power limits are not exceeded while at the same time ensuring that HSDPA throughput is not unnecessarily constrained. FIG. 5 illustrates various power levels of interest in the high speed transport channel power control. The maximum transmit power level $P_{max}$ set by the RNC is shown as a dashed line at the top of the graph. A portion of that max power is allocated to active, non-high speed channel UEs—$P_{non-HS}$. The total transmit power in the cell including both high speed and non-high speed channels is $P_{tx}$. At time t, the measured value of $P_{non-HS}$ is used as the estimated value of $P_{non-HS}$ in the future. This gives an available transmit power $P_{hs}$ from that estimated level to the maximum power level $P_{max}$, assuming that there is no limit on how fast the total power may increase. In this example, it is apparent that if the full available amount of power were immediately used for a high speed transmission to a UE, there would likely be a serious mismatch between the CQI reported at time t (e.g., low interference) and the actual channel quality right after the base station starts transmitting over the high speed channel to the new user (e.g., higher interference). Because the transport format was selected based on the reported CQI at time t, the likelihood of errors and increased retransmissions is high because the estimated channel quality is likely much lower. As mentioned in the background, this mismatch may occur frequently during the TCP slow start phase and leads to frequent retransmissions that substantially reduce throughput.

The HSDPA controller 32 limits the rate at which the high speed transport channel can increase its transmit power to a new UE, which is especially important when the available power is large. Rather than use a constant power increase rate limit, which negatively impacts the achievable bit rate over the high-speed downlink channel, the HSDPA controller 32 employs a variable power increase rate limit approach. The variability can be determined or set depending on one or more factors and can be implemented in any suitable fashion.

In one non-limiting example implementation, the variable power increase factor is varied with the total downlink transmitted power in the last subframe. The variance be linear, non-linear, continuous, or discontinuous. From the CQI report from the UE and the available power for the HS-DSCH, the HSDPA controller 32 calculates a power increase rate that is permissible under those conditions. The HSDPA controller 32 knows the maximum power that can be used in the cell and the power currently not being used for HS transmission. The difference between the maximum possible power and the power not used for HS transmission can, without additional power limitation, be used for HS transmission. If the permissible power increase is not too large, the HSDPA controller 32 may rapidly increase up to the available power to maximize throughput. But for larger available power increases, the HSDPA controller 32 moderates that increase. For example, the HSDPA controller 32 uses a more conservative value for the transmit power increase factor at the beginning of the high speed downlink transmission, and then a more liberal value later in the high speed downlink transmission.

Figure 6:
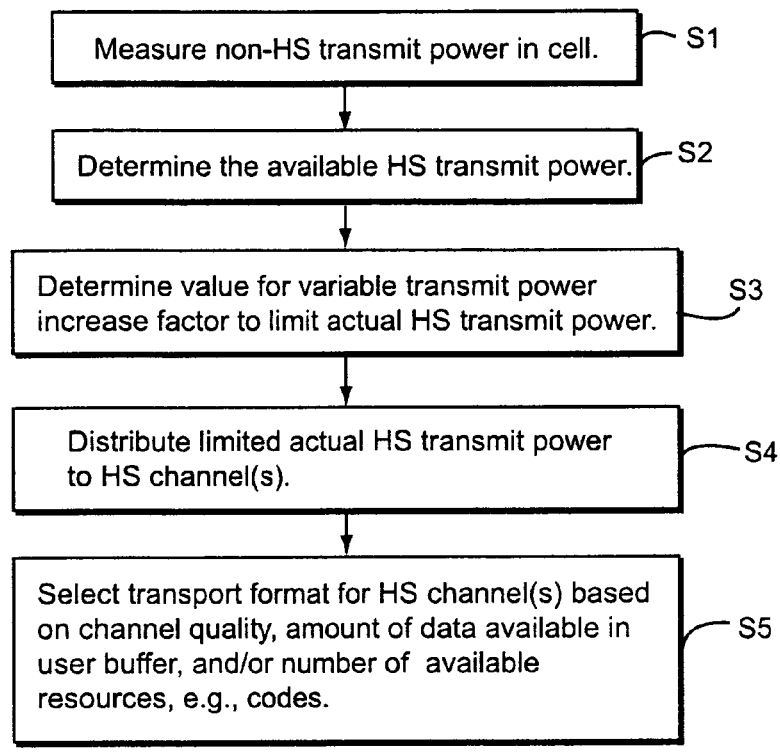
FIG. 6 is a flow chart illustrating example non-limiting procedures for controlling HS channel power levels using a variable transmit power increase factor.

FIG. 6 illustrates in flow chart form example procedures for determining the transport format for a HS-transmission where the transmit power for that HS-transmission controlled in a varying fashion during the HS-transmission. Initially, the transmit power level for all non-high speed transmissions in the cell is measured (step S1). The available HS-transmission power is determined based on the measurement in step S1 and the maximum power limit set for the cell (step S2). The value for a variable transmit power increase factor is determined and used to limit the actual HS-transmission power (step S3). The limited HS-transmission power is then distributed to the HS channels assuming there are more than one (step S4). The transport format for the HS channels is then selected based on the channel quality (e.g., CQI), amount of data available in the user buffer for the HS-transmission, and/or the available radio resources, e.g., spreading codes (step S5).

Consider the following non-limiting, example embodiment. The total transmitted power in the last subframe in the cell is $P_{tx}$. $P_{HS}$ denotes the power (in Watts) available for the HSDPA channel(s), and let $P_{non-HS}$ denote power used by the other (non-HS) channels. The transmit power limiting algorithm works as follows. If $$P_{HS}+P_{non-HS}>P_{tx}*F,$$

then $P_{HS}$ is determined using:

$$P_{HS}=P_{tx}*F-P_{non-HS} \qquad (1)$$

The factor F is the power increase factor. The inventors recognized that it is not possible to find a single F value that maximizes the web object bit rate for the both the worst case download scenarios and the best case download scenarios. If the web object bit rate is maximized for the best case scenarios, the cost is a lower attained bit rates for the worst case scenarios. Because $P_{tx}$ is the used power and not the available power, when the used power is small, e.g., when a new user enters the system, it is desirable to have a smaller F factor. But when $P_{tx}$ is large, a larger F factor is allowed.

One non-limiting example of how to vary power increase factor F is to let F depend on the previous transmitted power according to:

$$F(\beta) = 1 + (\beta - 1) \cdot \left(\frac{P_{tx}}{P_{max}}\right)^{\beta} \qquad (2)$$

where $\beta \geq 1$ is a parameter. The parameter $\beta$ could be an operator-controlled constant or a system constant. Typically, the parameter $\beta$ is not intended to be changed during the lifetime of a HS transmission. $P_{tx}$ is the total transmitted power in the last subframe, time transmission interval (TTI), or time slot (TS), etc., and $P_{max}$ is the maximum transmit power permitted. A larger $\beta$ value means a larger F value, and a larger F value means the HS-transmission power increases faster.

Alternatively, instead of limiting the increase of high-speed channel transmit power directly, the high speed channel transmit power may be limited by controlling the transport format selection. The transport format is selected to be more conservative at the beginning of the HS-transmission using for example a transport format (TF) with a lower bit rate than what is indicated by or given the current CQI. If for example the CQI report in combination with the total power available suggests a TF with a bit rate of 4 Mbps in the beginning of a transmission, the HSDPA controller may select a TF with a smaller rate, for example, 2 Mbps. Eventually, as the HS transmission continues and the CQI reporting takes the increased interference into account and is more reliable, the HSDPA controller can rely on the CQI report. The HSDPA controller may, for example, apply an offset with respect to the TF suggested by the CQI report when the transmission commences and decrease the offset gradually as the transmission continues. If the block error rate (BLER) probability is the same as the BLER target, this alternative method also leads to a power that increases in variable steps since a smaller transport format requires less power than a larger transport format for the same BLER.

Figure 7:
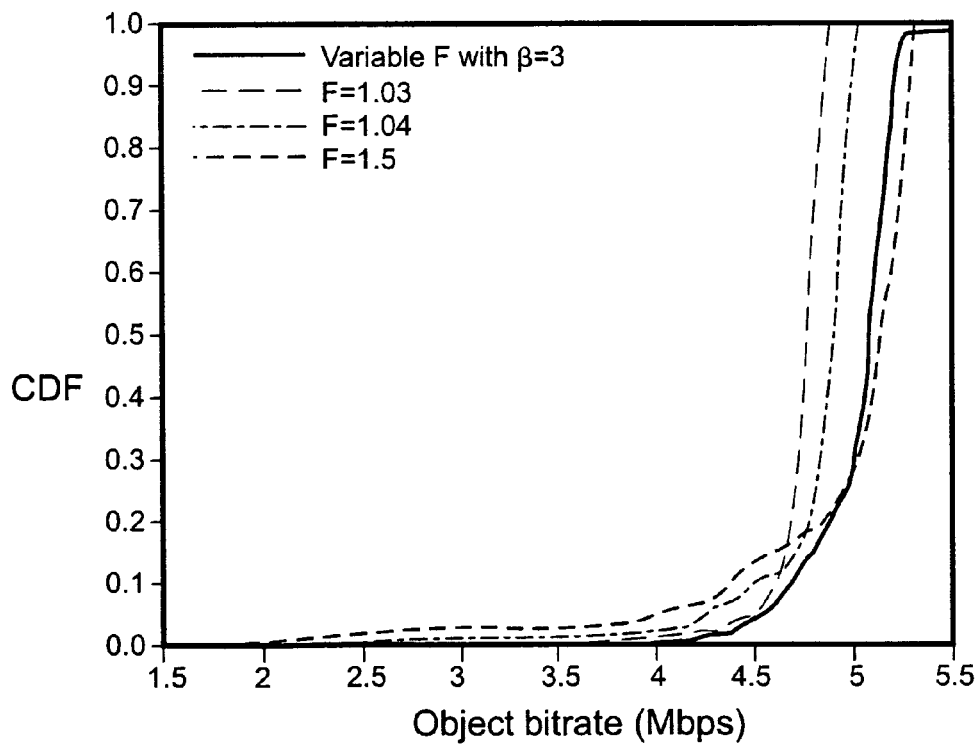
FIG. 7 is a graph illustrating a cumulative distribution function (CDF) versus downloaded object bit rate using a constant transmit power increase limitation compared to using a variable transmit power increase limitation.

FIG. 7 compares the cumulative distribution function (CDF) of the bit rates for 10 Mbyte web object downloads performed by a single UE in a good receiving position. As explained above, the CDF describes the probability that a variable takes on a value less that or equal to a certain number. The graph assumes only a single cell and that no other UEs are present in the cell. The variable F approach used in equations (1) and (2) with a $\beta$ of 3 gives a much lower probability of low throughput than the fixed power increase algorithm with constant F values of 1.03, 1.04, and 1.5. In other words, the variable F algorithm has a higher probability of higher throughput that the constant F algorithm. This improvement is accomplished at a small performance cost in terms of reachable throughput. The variable F curve is only beaten by a constant F curve with F=1.5 for power increase step factors which give relatively high probability of low throughput.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for regulating the transmit power level of a data transmission over a high speed shared radio channel in a cell in a radio communications system, comprising:

determining an available amount of power that can potentially be used for the high speed radio transmission;

determining a variable power increase factor that controls a rate at which the transmit power level for a high speed data transmission over the high speed shared radio channel can increase;

setting the power level of the high speed data transmission based on the determined variable power increase factor; and transmitting data over the high speed data transmissions channel based on the set power level, wherein the power level of the high speed data transmission is determined in accordance with the following:

$$P_{HS}=P_{tx}*F-P_{non-HS}$$

where $P_{HS}$ is the power available for the high speed data transmission channels in the cell, $P_{tx}$ is the total transmit power in the last subframe in the cell and $P_{non-HS}$ is the power used for non-high speed data communications in the cell, and F is the variable power increase factor.

2. The method in claim 1, wherein the variable power increase factor is lower at the beginning of the data transmission over the high speed shared radio channel, and later in the data transmission over the high speed shared radio channel, the variable power increase factor is greater.

3. The method in claim 1, further comprising:

measuring a power level of transmissions over non-high speed radio channels in the cell, wherein the available amount power for the high speed data transmission is determined using the measured power level.

4. The method in claim 1, wherein setting the power level of the high speed data transmission includes selecting a transport format for the high speed data transmission.

5. The method in claim 1, wherein the variable power increase factor F is determined in accordance with the following:

$$F(\beta) = 1 + (\beta - 1) \cdot \left(\frac{P_{tx}}{P_{max}}\right)^{\beta}$$

where $\beta \geq 1$ and $P_{max}$ is the maximum total power level permitted in the cell.

6. The method in claim 5, wherein $\beta$ is selected by an operator or system vendor.

7. Apparatus for regulating the transmit power level of a data transmission over a high speed shared radio channel in a radio communications system, comprising:
means for determining an available amount of power that can potentially be used for the high speed radio transmission;
means for determining a variable power increase factor that controls a rate at which the transmit power level for a high speed data transmission over the high speed shared radio channel can increase;
means for setting the power level of the high speed data transmission based on the determined variable power increase factor; and
means for transmitting data over the high speed data transmissions channel based on the set power level,
wherein the means for setting is configured to determine the power level of the high speed data transmission in accordance with the following:

$$P_{HS} = P_{tx} * F - P_{non-HS}$$

where $P_{HS}$ is the power available for the high speed data transmission channels, $P_{tx}$ is the total transmit power in the last subframe in the cell, and $P_{non-HS}$ is the power used for non-high speed data communications in the cell, and F is the variable power increase factor.

8. The apparatus in claim 7, wherein means for setting is configured such that the variable power increase factor is lower at the beginning of the data transmission over the high speed shared radio channel, and later in the data transmission over the high speed shared radio channel, the variable power increase factor is greater.

9. The apparatus in claim 7, further comprising:
means for measuring a power level of transmissions over non-high speed radio channels,
wherein the means for determining is configured to determine the available amount power for the high speed data transmission using the measured power level.

10. The apparatus in claim 7, wherein the means for setting is configured to select a transport format for the high speed data transmission.

11. The apparatus in claim 7, wherein means for determining the power increase factor F is configured to determine the variable power increase factor F in accordance with the following:

$$F(\beta) = 1 + (\beta - 1) \cdot \left(\frac{P_{tx}}{P_{max}}\right)^{\beta}$$

where $\beta \geq 1$ and $P_{max}$ is a maximum total transmission power level permitted in the cell.

12. A base station for regulating the transmit power level of a data transmission to a wireless user equipment over a high speed downlink shared radio channel in a radio communications system, comprising:
radio transmitting circuitry for transmitting data over the high speed downlink shared radio channel;
electronic control circuitry configured to:
determine an available amount of power that can potentially be used for the high speed radio transmission;
determine a variable power increase that controls a rate at which the transmit power level for a high speed data transmission over the high speed shared radio channel can increase; and
set the power level of the high speed data transmission based on the determined variable power increase; and
a transmission scheduler, coupled to the radio transmitting circuitry and electronic control circuitry, for controlling transmission data over the high speed data transmissions channel based on the set power level,
wherein the electronic control circuitry is configured to determine the power level of the high speed data transmission in accordance with the following:

$$P_{HS} = P_{tx} * F - P_{non-HS}$$

where $P_{HS}$ is the power available for the high speed data transmission channels, $P_{tx}$ is the total transmit power in the last subframe in the cell, and $P_{non-HS}$ is the power used for non-high speed data communications in the cell, and F is a power increase factor.

13. The apparatus in claim 12, wherein the electronic control circuitry is configured to determine a variable power increase factor such that the variable power increase is lower at the beginning of the data transmission over the high speed shared radio channel, and later in the data transmission over the high speed shared radio channel, the variable power increase is greater.

14. The apparatus in claim 12, further comprising:
power measurement circuitry for measuring a power level of transmissions over non-high speed radio channels,
wherein the electronic control circuitry is configured to determine the available amount power for the high speed data transmission using the measured power level.

15. The apparatus in claim 12, wherein the electronic control circuitry is configured to select a transport format for the high speed data transmission.

16. The apparatus in claim 12 wherein the electronic control circuitry is configured to determine the power increase factor F in accordance with the following:

$$F(\beta) = 1 + (\beta - 1) \cdot \left(\frac{P_{tx}}{P_{max}}\right)^{\beta}$$

where $\beta \geq 1$ and $P_{max}$ is a maximum total transmission power level permitted in the cell.

17. The apparatus in claim 12, wherein $\beta$ is selected by an operator or system vendor.

* * * * *